No. 744,632. Patented November 17, 1903.

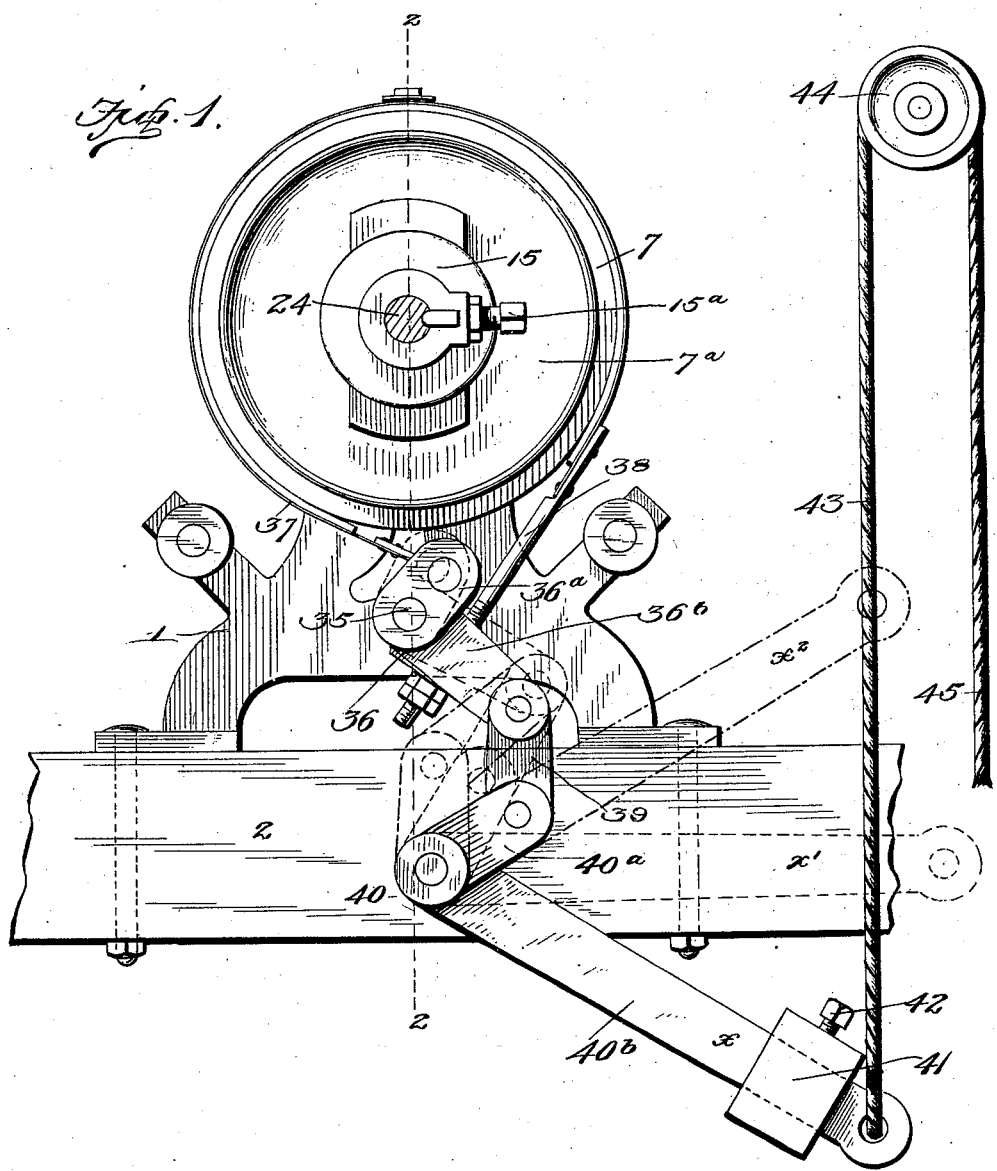

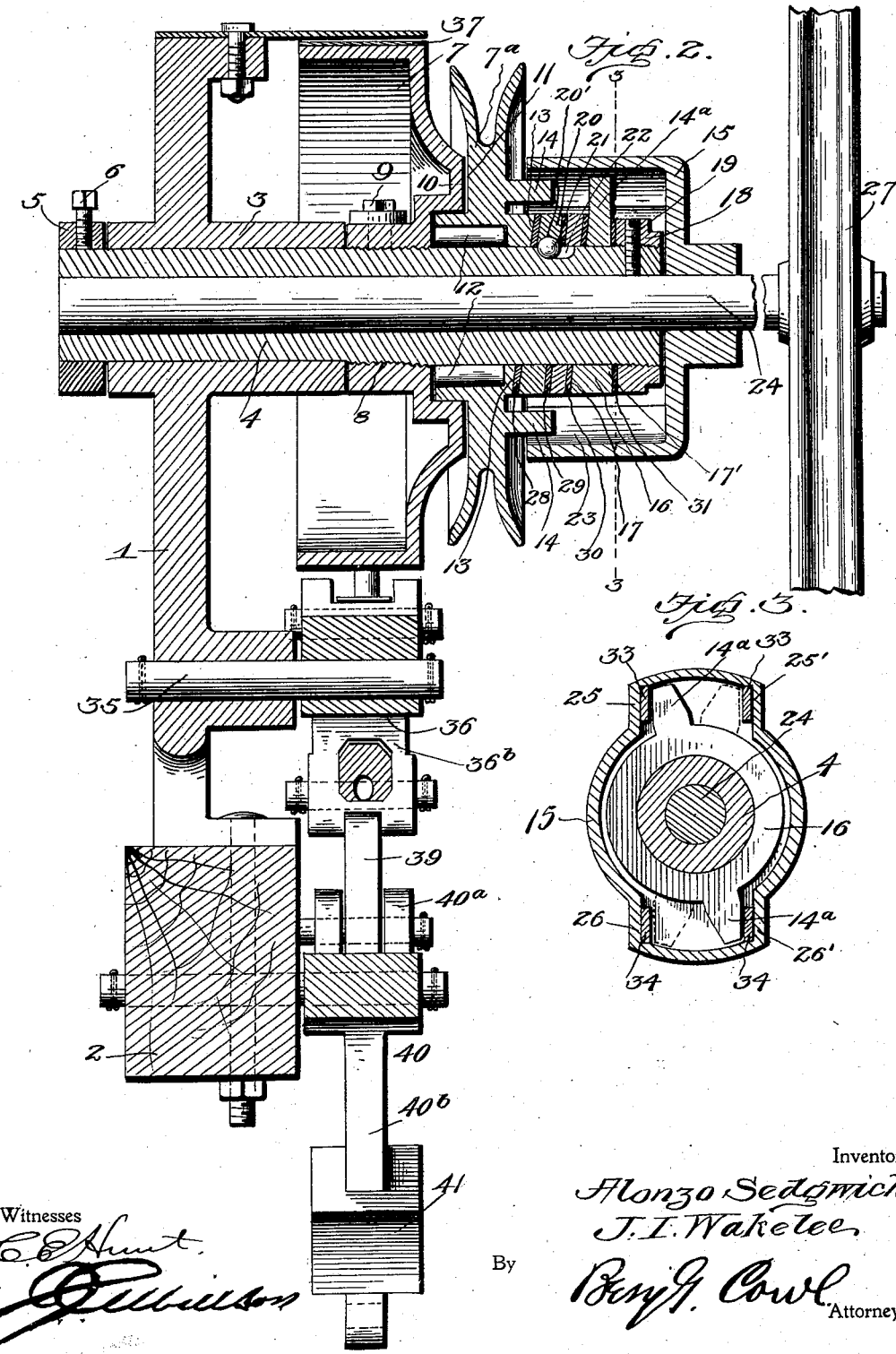

UNITED STATES PATENT OFFICE.

ALONZO SEDGWICK, OF POUGHKEEPSIE, NEW YORK, AND JUSTUS I. WAKELEE, OF ENGLEWOOD, NEW JERSEY.

AUTOMATIC FRICTION-BRAKE.

SPECIFICATION forming part of Letters Patent No. 744,632, dated November 17, 1903.

Application filed August 1, 1903. Serial No. 167,908. (No model.)

*To all whom it may concern:*

Be it known that we, ALONZO SEDGWICK, residing at Poughkeepsie, in the county of Dutchess and State of New York, and JUSTUS I. WAKELEE, residing at Englewood, in the county of Bergen and State of New Jersey, citizens of the United States, have invented new and useful Improvements in Automatic Friction-Brakes, of which the following is a specification.

This invention relates to improvements in brake mechanism for dumb-waiters, hand-elevators, and the like; and its object is to provide a combination hand-brake and automatic brake which may be used independently or together at the option of the operator and which will enable a car to be effectually controlled in either case, the brake mechanism obviating all liability of a car falling or of an excessively-counterweighted car being rushed to the top of the well, while in lowering a heavy load or in allowing an excessively-counterweighted car to rise the machine may be controlled and quickly stopped without shock or strain on the elevator mechanism.

In the accompanying drawings we have shown certain means for carrying our invention into practical effect, without, however, intending to limit the invention to the particular construction and combination which for the sake of illustration we have set forth.

In the said drawings, Figure 1 is an end elevation of a friction-clutch embodying our invention. Fig. 2 is a vertical section on line 2 2 of Fig. 1, and Fig. 3 is a section on line 3 3 of Fig. 2.

Referring now more particularly to the drawings, the numeral 1 represents a bearing-bracket fixed to a suitable support 2 and provided with a hub 3, in which rotates a sleeve 4, held from endwise movement in one direction therein by a collar 5 and coacting set-screw 6. A brake-wheel 7 has a threaded connection, as shown at 8, with the sleeve and is further connected thereto by a set-screw 9, by means of which it is fixed to said sleeve to turn therewith. This brake-wheel forms part of a friction-clutch, hereinafter specifically described, and is provided with a friction-face 10. The hub of the wheel 7 abuts against the opposite end of the hub 3 from the collar 5 and limits the endwise movement of the sleeve in the reverse direction. Mounted to rotate loosely on the sleeve 4 is a grooved pulley or hoist-wheel 7ª, whose inner face is provided with a friction-surface 11 to coact with the friction-face 10 of the wheel 7, and the hub of said pulley is formed with an annular concentric chamber to receive cylindrical rollers 12, which form a bearing for the pulley on the sleeve. The outer face 13 of the pulley-hub is inclined with reference to the plane in which the pulley rotates. It is also provided with opposite lugs 14 14, cast on it and fitted to engage with the hood 15 for the purpose of rotating the hoist-wheel, as hereinafter explained. Loosely mounted on said sleeve is a collar 16, having its inner plane face 17 inclined to reversely correspond to the inclined face 13 of the pulley-hub, while its outer plane face 17' is parallel with the inner face of a collar 18, threaded upon the contiguous end of the sleeve and held against disconnection by a set-screw 19, said collar constituting a contact-shoulder to coöperate with the said collar 16. On the sleeve intermediate the pulley 7ª and collar 16 is a plane washer 20, which at one point in its inner edge is formed with a pocket 20' to receive the projecting surface of the ball-key 21, seated in the longitudinal groove 22, formed in the sleeve 4, which prevents rotation of the washer on the sleeve, but permits its free lateral movement. The collar 16 is formed with two oppositely-disposed radial lugs 14ª, which, together with the hoist-wheel lugs 14, extend into the corresponding radial recesses or chambers 23, formed in the hood 15, fixed by the set-screw 15ª on the shaft 24, which turns within the sleeve 4. The hood 15 extends over the projecting end of the sleeve, the collar, the washer, and the inclined faces of the hub of the pulley to form a protector or dust-proof case for these parts and also for the purpose of operating the driving mechanism. The lateral parallel walls 25 25' and 26 26' of the hood project into the path of the radial lugs 14 and 14ª, which have a limited movement between them. The hand-wheel 27 may be fixed at any convenient point on the shaft 24 for manipulating it.

28, 29, 30, and 31 denote friction-washers, which may be formed of leather, vulcanized or indurated fiber, metal, or other suitable material, and are interposed between the contiguous faces of the parts to take up wear and contribute to the noiseless working of the clutch. Strips 33 33 and 34 34 of similar material are fitted to the inner parallel faces of the walls of the hood to accomplish the same purpose, and when worn these washers and strips may be readily replaced, thus making the clutch as good as new for practical purposes.

Arranged below the wheel 7 is a shaft or stud 35, upon which is pivoted an angle-lever or bell-crank lever 36, having a short arm $36^a$, to which is connected one end of a friction-band 37, and a long arm $36^b$, to which the other end of the band is connected by means of an adjustable stem or bolt 38, which adapts the band 37 to be adjusted to compensate for wear. The arm $36^b$ of the lever 36 is further connected by a link 39 with the short arm $40^a$ of an angle-lever or bell-crank lever 40, the long arm $40^b$ of which carries an adjustable counterweight 41, adapted to be fixed thereto in adjusted position by a set-screw or like fastening 42. The friction-band 37 is adapted to be drawn into contact with the periphery or braking-surface of the brake-wheel 7 to hold the same from rotation, and its operation is effected automatically or manually through the instrumentality of the lever 40, which through the medium of the link 39 and bell-crank lever 36 serves when moved in one direction or the other to contract or expand the band, thus adapting it to engage or release the brake-wheel. The lever 40 normally has the position $x$, (shown in full lines in Fig. 1,) to which point or position it is moved by the counterweight 41 and in which position the connections are adjusted properly to hold the band 37 in contact with the brake-wheel 7. The lever 40 is also capable of adjustment to two other positions shown in said figure—viz., the central position $x'$ (shown in dotted lines) and the uppermost position $x^2$. (Shown by alternate dots and dashes.) In position $x'$ the lever is adjusted with its operative connections to expand the brake-band 37 and hold it out of contact with the wheel 7, and in the raised position $x^2$ (indicated by the dot-and-dash lines) the lever, with its connections, is adjusted to also apply the brake. Thus it will be seen that when the lever is adjusted to the intermediate dotted-line position the wheel 7 will be free to revolve with the sleeve 4, but that when adjusted to either of the other positions the band 37 will engage the wheel 7 and hold it against movement and when the lever 40 is released the weight 41 will automatically cause it to assume the full-line position, thereby automatically applying the brake.

It will be observed from the foregoing description that the brake-lever travels from the point $x$ to the point $x^2$, which points indicate or determine the extremes of its motion. At either of these extremes the brake holds the brake-wheel firmly and rigidly. At the point between these extremes—namely, at the central point $x'$—the brake is entirely released from the brake-wheel, so that by pulling slightly harder on the brake-line or releasing the pressure slightly the brake is allowed to come again in contact with the brake-wheel, thus enabling the speed of the mechanism, and consequently the car, to be controlled at the will of the operator. This is a very important feature of our invention, in that as the pressure of the brake-band on the brake-wheel may be regulated as desired the lowering of a heavy load or the upward motion of a car excessively counterweighted may be controlled in a smooth and continuous manner instead of being completely stopped or entirely released, so that the brake mechanism may be employed to check or entirely stop the car without racking or too sudden a shock or jar on the elements of the brake mechanism.

A brake cord or rope 43 is connected at one end to the arm $40^b$ of the lever 40, thence passes upward over and around a guide sheave or pulley 44 and has its opposite end projecting downward to form a pull-line 45, by means of which the lever may be adjusted, as will be readily understood. The operation of the clutch mechanism when the wheel 7 is held by the brake-band to form a fixed braking-surface is as follows: When the thickest section of the collar 16 is opposed to the thinnest section of the hub of the pulley $7^a$, which is the position of said collar with reference to said hub when the radial lugs 14 14 and $14^a$ $14^a$ are in contact with either of the oppositely-disposed walls 25 and 26' of the hood, the pulley and shaft, with the attached hood, are free to revolve in either direction, and consequently the car or carriage may be moved up or down by means of the hand-wheel on the shaft 24 or some other suitable equivalent operating device. When, however, the hand-wheel is released, the car necessarily moves a very short distance up or down, depending on whether it is running light or loaded, and the corresponding movement of the hoist-pulley, the hood being left free and allowing the lugs 14 14 and $14^a$ $14^a$ to move out of alinement, as shown by dotted lines in Fig. 3, causes the inclined face of its hub to assume the function of an annular wedge, thus crowding the collar 16 against the shoulder 18 on the sleeve and the bearing-face 11 of the pulley against the brake-surface 10 of the brake-wheel 7, thereby as said brake-wheel is held from movement by the brake-band noiselessly and positively locking the machine against an upward or downward movement and at the same time leaving it in condition for immediate travel when the hand-wheel is manipulated.

The form of hoist-wheel and coacting wedging friction brake mechanism herein shown is substantially the same as that disclosed in prior patent, No. 625,359, granted May 23, 1889, to Alonzo Sedgwick, and provides an automatic lock or friction-brake for automatically controlling the operation of the car. Any other type of automatic lock may, however, be employed. This automatic lock is very efficient for controlling the speed of and stopping light cars, but is subjected to heavy strain when lowering a heavy load or controlling the upward movement of an excessively-counterweighted car, the jar or shock each time the load is arrested or the upwardly-traveling car brought to a stop transmitting a severe shock to the brake mechanism. The present invention is designed to provide a brake mechanism which shall have all the advantages of the automatic lock in controlling the action of the car, so as to secure an entire automatic control and avoid all possibility of a car falling or of an excessively-counterweighted car rushing to the top of the well, while at the same time providing a brake wheel and band coacting with the automatic lock in such manner as to attain the further advantage of making the machine controllable by the operator in lowering the heavy load or in controlling the upward movement of an empty or excessively-counterweighted car, such brake wheel and band enabling braking power to be applied as desired, so as to do away entirely with the shock and consequent strain on the mechanism which an automatic-lock machine receives under these conditions.

It will be understood from the foregoing description that when the brake-wheel 7 is held fixed the wedging brake mechanism may be used as an automatic brake for light work and when the elevator is allowed to descend under the weight of a light load or is raised and lowered by manual manipulation of the hoisting mechanism through shaft 24. When, on the other hand, heavy loads are being handled or the empty car is run up by the use of a heavy or overbalancing counterweight, it is desirable to provide a strong brake device and one which will effect an easier stoppage of the heavy load, and under such conditions the friction band-brake is employed. In controlling this brake it will be clear from the foregoing description that the operator holds the pull-line 45 and by the manipulation of the same exercises complete control over the brake-band 37. In order to release said brake-band, it is necessary for the operator to move the brake-lever 40 toward the intermediate dotted-line position shown in Fig. 1, which, as hereinbefore described, slacks the brake-band and allows the car to travel under the action of the load or counterweight. It will be observed that a certain amount of pulling force must be exerted to move the lever 40 to the position $x'$. If the operator fails to use this amount of force or uses more than this force, the brake will not be released, or will be momentarily released and then immediately applied, as the lever-arm $40^b$ will not in the one case be lifted to position $x'$ or in the other case will be moved past such position. Hence the operator must exercise good judgment in controlling the brake to permit the machine to move in the direction influenced by the load or excessive counterweight, and careless or ignorant handling cannot result in damage, as unless the brake mechanism is properly handled the car will not be permitted to move. The car cannot be operated, therefore, unless properly operated.

It will be seen that by the use of the brake-wheel 7 and brake-band 37 the operator may control the speed of a moving car at his own option by simply regulating the pressure he applies to the brake-line instead of being compelled to operate a traveling hand-rope, and at the same time that the operator has the reserve advantage of the automatic lock, which in the event he should let go the brake-line or should he pull too hard on the same will check or stop the car.

The object of employing two sets of coacting brake devices, one governed by the hoisting mechanism and operating to automatically lock the car against movement when the hand-rope of such mechanism is released and the other manually governed to apply graduated braking power, is as follows: In a machine controlled solely by a brake device of the first kind, such as is shown in the present instance in the form of the wedging-brake mechanism, a heavily-loaded or overweighted car cannot be allowed to descend or ascend with a steady and continuous motion, the action being more or less uneven and jerky, as on the operator pulling on the hand-rope to unlock the machine the load or counterweight will cause the machine to run ahead of the hoist-wheel until, as a result, the machine is automatically locked, thereby throwing great strain on the car and mechanism in stopping the motion. Then the operator pulls again on the hand-rope, unlocks the machine, and the same process is repeated, so that the motion is, in fact, a succession of jerks and jars, which is obviously objectionable. On the other hand, the independent use of an automatic band-brake is equally objectionable, for the reason that the operator in releasing the same must employ one hand on the brake-line, leaving but one hand to operate the car with. This would not answer in raising a load or lowering an excessively counterweighted car, as the operator would require the use of both hands on the hoist-rope. It will thus be seen that it is highly desirable to have the brake mechanism so constructed that when the car is to be moved in opposition to the load or counterweight both hands of the operator may be free to raise or lower the car and the motion will be stopped automatically when the operator lets go the hoist-rope or operating-rope, and so that when the car is moving under the influence of a heavy load or excess counterweight it may be allowed to descend or ascend with a steady and continuous motion and without the necessity of operating the hoist-rope. In the present instance in lifting a load or lowering an excessively-counterweighted car the operator constantly pulls in one direction or other on the hoist-rope and the automatic wedging-brake remains unlocked as long as the operator continues to pull, but automatically brakes or locks the machine as soon as he lets go the rope, thus preventing the car from running either up or down. In this operation a smooth and uniform motion is secured, depending upon the steadiness of the pull upon the rope. When, however, the car is to be moved in the direction in which the load or counterweight exerts its influence, the band-brake is employed, and by its use the operator is enabled to control the speed of the car to a nicety, applying more or less braking power, as required, to insure a continuous motion free from shocks or jars, the brake being automatically applied to stop the car whenever the operator pulls too hard upon or releases the hand-line. It will therefore be clear that our combination-brake gives complete control of the car under all conditions of service and prevents all possibility of accident from careless handling.

As before stated, the patented automatic brake-lock may be employed, or in lieu thereof any other suitable automatic brake-lock may be used in conjunction with the brake-band mechanism; also, we may substitute for the brake-band mechanism any other type of equivalent mechanism which will coöperate with an automatic lock to accomplish the result set forth. Hence, we do not limit our invention to the features of construction and arrangement of parts herein shown, but reserve the right to make such modifications as fall within the spirit and scope of our invention.

Having thus described our invention, what we claim as new, and desire to secure by Letters Patent, is—

1. The combination with a hoisting device, of brake mechanism, a second brake mechanism, the two brake mechanisms adapted to operate together or independently to control the said hoisting device, one of said brake mechanisms being manually and the other automatically governed, and controlling means for fixing one of said brake mechanisms to operate as the stationary member of a clutch to be engaged by the other brake mechanism acting as a complemental movable clutch member.

2. An operating element forming a clutch member, two sets of braking devices coöperating therewith, and means for holding one of said braking devices fixed to form the stationary part of a friction-clutch against which the said operating element is moved by the other braking device, substantially as described.

3. In combination with a rotary part, a brake-wheel fixed thereto, a second wheel loose on said rotary part, means for locking the brake-wheel, and means for moving the said second wheel into locking engagement with the brake-wheel, substantially as described.

4. The combination with a hoisting-wheel, and an automatic shifting device therefor, of a brake-wheel adapted to be engaged by the hoisting-wheel to form a clutch to hold the hoisting mechanism against movement, and means for controlling the brake-wheel, substantially as described.

5. The combination with a hoisting-wheel, and an automatic shifting device therefor, of a brake-wheel adapted to be engaged by the hoisting-wheel to form a clutch to hold the hoisting mechanism against movement, and means for automatically engaging and holding the brake-wheel against movement, substantially as described.

6. The combination with a hoisting-wheel, and an automatic shifting device therefor, of a brake-wheel adapted to be engaged by the hoisting-wheel to form a clutch to hold the hoisting mechanism against movement, a brake-band to engage the brake-wheel, a controlling-lever for operating said band, and automatic means for retracting said lever, substantially as described.

7. The combination with a hoisting-wheel, and an automatic shifting device therefor, of a brake-wheel adapted to be engaged by the hoisting-wheel to form a clutch to hold the hoisting mechanism against movement, a brake-band to engage the brake-wheel, a controlling-lever for operating said band, and connections between the lever and band whereby the lever has an intermediate position and is movable to opposite braking positions, substantially as described.

8. The combination with a hoisting-wheel, and an automatic shifting device therefor, of a brake-wheel adapted to be engaged by the hoisting-wheel to form a clutch to hold the hoisting mechanism against movement, a brake-band to engage the brake-wheel, a controlling-lever for operating said band, connections between the lever and band whereby the lever has an intermediate releasing position and is movable to opposite braking positions, and automatic means for moving the lever to one of said braking positions, substantially as described.

9. A clutch-brake of the character described, comprising a clutch-pulley, a rotating member on which the clutch-pulley is loosely mounted, a clutch brake-wheel fixed to said rotating member, means for locking the brake-wheel, and means for moving the clutch-pulley into engagement with the brake-wheel and fixing the same to the said rotating element.

10. In combination with a supporting-bracket, a sleeve journaled therein, a shaft journaled in said sleeve, a pulley-wheel fixed to the sleeve, a pulley loosely mounted on the sleeve and adapted to engage said brake-wheel, means for holding the brake-wheel against movement, and means for actuating the said shaft and by motion of said shaft moving the said pulley into clutching engagement with the brake-wheel.

11. In combination with a support, a sleeve adapted to rotate therein, a shaft adapted to rotate within the sleeve, a brake-wheel fixed to the sleeve, a brake-band to engage said brake-wheel, means for applying and releasing the brake-band, means for automatically actuating the said applying and releasing means to normally maintain the brake-band in braking position, a pulley loosely mounted on the said sleeve, clutch mechanism acting on the pulley for moving it into or out of engagement with the brake-wheel and connecting it with or disconnecting it from the sleeve, said clutch mechanism being operatively connected to the shaft, and means for actuating said shaft to operate the clutch mechanism.

12. Brake mechanism for controlling devices of the character described, comprising coacting braking devices, one governed by the hoisting mechanism so as to be free when said mechanism is operated and applied when said mechanism is released, and the other adapted to be manually controlled to govern the speed of the car when moving under a load or counterweight and to automatically lock when released.

13. In brake-band mechanism for controlling the operation of hand-elevators and the like, the combination with the hoisting mechanism of the elevator, of coacting brake devices, one of said devices being locked and unlocked by the operation and cessation of operation of said mechanism when the elevator is raised or lowered thereby, and the other adapted to be operated independently by the operator to apply graduated power to control the speed of the elevator when operated by the load or counterweight, substantially as described.

14. A hand-elevator or like hoisting apparatus provided with hoisting means, means controlled by said hoisting means for automatically stopping the elevator when the operation of said hoisting means is arrested, and means adapted to be manually operated to control the speed of the elevator independently of the first-named means when running under the action of a load or counterweight, substantially as described.

15. In a hand-elevator or like hoisting apparatus, the combination of a hoisting means, a brake-wheel coöperating therewith, a brake-band to engage said wheel, brake mechanism of which the brake-wheel forms a part for automatically stopping the elevator upon the cessation of operation of said hoisting means, a manually-operable device for applying the brake-band, and means for normally holding the brake-band applied, substantially as described.

In testimony whereof we have signed our names to this specification in the presence of two subscribing witnesses.

ALONZO SEDGWICK.
JUSTUS I. WAKELEE.

Witnesses as to signature of Alonzo Sedgwick:
A. NOEL,
CHARLES S. COOLEY.

Witnesses as to signature of Justus I. Wakelee:
JAMES H. GRIFFITH, Jr.,
WENDELL J. WRIGHT.